United States Patent
Risch (10) Patent No.: US 12,187,426 B2
(45) Date of Patent: Jan. 7, 2025

(54) WING FOR AN AIRCRAFT

(71) Applicant: Airbus Operations GmbH, Hamburg (DE)

(72) Inventor: Ronald Risch, Hamburg (DE)

(73) Assignee: AIRBUS OPERATIONS GmbH, Hamburg (DE)

(*) Notice: Subject to any disclaimer, the term of this patent is extended or adjusted under 35 U.S.C. 154(b) by 20 days.

(21) Appl. No.: 18/103,047

(22) Filed: Jan. 30, 2023

(65) Prior Publication Data
US 2023/0365248 A1    Nov. 16, 2023

(30) Foreign Application Priority Data
Jan. 31, 2022   (EP) .................................. 22154391

(51) Int. Cl.
*B64C 3/56*   (2006.01)

(52) U.S. Cl.
CPC ...................................... *B64C 3/56* (2013.01)

(58) Field of Classification Search
CPC .......... B64C 3/56; B64C 3/546; B64C 23/072
See application file for complete search history.

(56) References Cited

U.S. PATENT DOCUMENTS

| | | | | |
|---|---|---|---|---|
| 5,310,138 A | * | 5/1994 | Fitzgibbon | B64C 3/56 244/49 |
| 2013/0327883 A1 | * | 12/2013 | Kordel | B64C 3/56 244/49 |
| 2015/0298793 A1 | * | 10/2015 | Fox | B64C 23/072 244/49 |
| 2015/0336657 A1 | * | 11/2015 | Townsend | B64C 3/56 244/99.2 |
| 2016/0090170 A1 | * | 3/2016 | Thompson | B64D 45/0005 701/3 |
| 2016/0251075 A1 | * | 9/2016 | Thompson | B64C 23/072 244/198 |
| 2016/0264232 A1 | * | 9/2016 | Briancourt | B64C 3/56 |
| 2018/0334238 A1 | * | 11/2018 | Winkelmann | B64C 3/56 |
| 2019/0248468 A1 | * | 8/2019 | Lorenz | B64C 3/56 |
| 2019/0322351 A1 | * | 10/2019 | Lorenz | F16D 63/00 |
| 2019/0337605 A1 | | 11/2019 | Lorenz | |
| 2020/0377224 A1 | * | 12/2020 | Brighton | B64D 45/0005 |

FOREIGN PATENT DOCUMENTS

EP    3 059 161    8/2016

OTHER PUBLICATIONS

Extended European Search Report for Application No. EP 22154391.1 dated Jul. 1, 2022, 5 pages.

* cited by examiner

*Primary Examiner* — Richard Green
*Assistant Examiner* — Ashesh Dangol
(74) *Attorney, Agent, or Firm* — Nixon & Vanderhye P.C.

(57) ABSTRACT

A wing for an aircraft is disclosed having a fixed wing, a foldable wing tip portion mounted to the fixed wing via a hinge rotatable about a hinge axis between an extended position and a folded position, and an actuation mechanism for moving the foldable wing tip portion. The actuation mechanism includes a drive arm mounted to the fixed wing in a manner rotatably driven about a drive axis, and the drive arm is configured to effect movement of the foldable wing tip portion between the extended position and the folded position upon rotation of the drive arm about the drive axis.

14 Claims, 11 Drawing Sheets

WING FOR AN AIRCRAFT

CROSS REFERENCE TO RELATED APPLICATION

This application claims priority to and incorporates by reference European Application Number EP 22154391.1, filed Jan. 31, 2022.

BACKGROUND

The present disclosure relates to a wing for an aircraft, and more specifically, to a foldable wing including a fixed wing and a foldable wing tip portion. A further aspect of the invention relates to an actuation mechanism for such a wing. Yet a further aspect of the invention relates to an aircraft comprising such a wing and/or comprising such an actuation mechanism.

Such a wing comprises a fixed wing for being mounted to a fuselage, and a foldable wing tip portion mounted to the fixed wing via a hinge or hinges rotatable about a hinge axis between an extended position, where the foldable wing tip portion extends as a continuous extension of the fixed wing which may be in a common plane with the fixed wing, and a folded position, where the foldable wing tip portion extends upwards or rearwards in order to reduce the overall span of the aircraft compared to the extended position. Specifically, when the foldable wing tip portion is foldable upwards, the hinge axis extends in a horizontal plane and/or in parallel to a chord line and/or in parallel to the wing surface and/or in a flight direction of the aircraft. Alternatively, when the foldable wing tip portion is foldable rearwards, the hinge axis extends in a vertical direction and/or in a wing depth direction and/or in a direction transverse or perpendicular to the wing surface.

The hinge comprises a tip hinge part mounted, may be fixedly mounted, to the foldable wing tip portion and a wing hinge part mounted, may be fixedly mounted, to the fixed wing and engaging the tip hinge part in a manner rotatable about the hinge axis. The foldable wing tip portion may be foldable upwards and the hinge axis is located at the upper leading edge side of the fixed wing. Furthermore, the tip hinge part is in the form of a goose neck, so that the foldable wing tip portion in the folded position can be pivoted to a far inboard position above the upper surface of the fixed wing.

The wing further comprises an actuation mechanism for actuating the foldable wing tip portion for movement between the extended position and the folded position. The actuation mechanism comprises a drive arm mounted to the fixed wing in a manner rotatably driven about a drive axis, for example, by a motor. For example, the drive arm might be mounted to a rotating drive shaft driven by a motor, such as an output shaft. The drive arm is configured to effect movement of the foldable wing tip portion between the extended position and the folded position upon rotation of the drive arm about the drive axis.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

Some known foldable wings have an actuation mechanism including a drive arm that is directly or indirectly mounted with its distal end to the foldable wing tip portion, e.g. via a linkage. Other known foldable wings have an actuation mechanism including two housing parts rotating relative to one another, one housing part mounted to the fixed wing and the other housing part mounted to the foldable wing tip portion.

SUMMARY

The present disclosure encompasses a wing having a simple, reliable and space-efficient actuation mechanism.

The present disclosure encompasses an actuation mechanism comprising a catch element, e.g. in the form or a stop element or a pin which may be fixedly mounted to, the tip hinge part or to the structure of the foldable wing tip portion. The drive arm and the catch element are configured such that in the extended position of the foldable wing tip portion upon rotation of the drive arm the drive arm contacts the catch element, i.e. comes into contact with, butts against or strikes against the catch element, and upon further rotation pushes the foldable wing tip portion towards the folded position.

In such a way, a wing with a very simple, compact and reliable actuation mechanism is provided that allows easy assembly and maintenance.

According to an exemplary embodiment, the drive axis is coaxial with the hinge axis. In such a way, the contact between the drive arm and the catch element is locally fixed, i.e. on locally fixedly locations of the drive arm and the catch element and not in the form of e.g. a sliding contact. This allows the catch element to be formed as a discrete contact or point contact, such as a pin, instead of being formed e.g. as an elongate guide surface.

According to an exemplary embodiment, the drive axis is parallelly spaced from the hinge axis. The catch element may be formed as an elongate guide surface along which the drive arms slides or alternatively rolls by a roller mounted to the drive arm, while the drive arm pushes the foldable wing tip portion towards the folded position. In such a way, the torque applied to the foldable wing tip portion and its rotational speed during rotation from the extended position to the folded position can be tailored as required.

According to an exemplary embodiment, the actuation mechanism comprises a latch mechanism for latching the foldable wing tip portion against the fixed wing in the extended position. The latch mechanism may be operated by rotation of the drive arm. In such a way, movement of the foldable wing tip portion between the extended position and the folded position as well as latching of the foldable wing tip portion in the extended position can be actuated only by movement of the drive arm, and thus only by a single motor, which largely simplifies the wing.

The latch mechanism may include a wing latch part mounted to, and may be fixedly mounted to, the fixed wing, and a tip latch part mounted to the foldable wing tip portion in a manner rotatable about a latch axis. The latch axis may be parallelly spaced from the drive axis. The tip latch part may be brought into latching engagement with the wing latch part by rotating the tip latch part about the latch axis when the foldable wing tip portion is in the extended position.

The drive arm may be coupled to the tip latch part via a latch link, such that the drive arm when rotating about the drive axis causes the tip latch part, through the latch link, to rotate about the latch axis. The latch link may be rotatably mounted to the drive arm by a rotatable joint, which may be at its one end, and is rotatably mounted to the tip latch part by a rotatable joint, which may be at its opposite end. In such a way, a simple, efficient and reliable latch mechanism is provided.

Furthermore, that the wing latch part is formed as a bolt or shaft. The tip latch part may be formed as a semi-circular sleeve engaging the bolt or shaft. As an alternative to the semi-circular sleeve the tip latch part might also be formed as a hook engaging the bolt or shaft.

According to an exemplary embodiment, the actuation mechanism is configured such that the drive arm rotates about the drive axis from a first position along a first angular range to a second position and subsequently from the second position along a second angular range to a third position, which may be by continuous rotation. In the first position of the drive arm the tip latch part is in a latched position relative to the wing latch part. In the second position of the drive arm the tip latch part is in an unlatched position relative to the wing latch part. When the drive arm is rotated along the first angular range from the first position to the second position, the tip latch part is rotated about the latch axis from the latched position to the unlatched position. In the first position and along the first angular range the drive arm is out of contact with the catch element. In or near the second position the drive arm contacts, which may strike against, the catch element. When the drive arm is rotated along the second angular range from the second position to the third position, the drive arm is in contact, which may be continuous contact, with the catch element, while the foldable wing tip portion is moved from the extended position to the folded position. In such a way, by continuous rotation of the drive arm the foldable wing tip portion can first be unlatched from the fixed wing and then be moved to the folded position.

According to an exemplary embodiment, the actuation mechanism comprises a pull-back mechanism for pulling the foldable wing tip portion from the folded position back to the extended position. The pull-back mechanism may comprise a pull-back catch, such as a pin or a projection, mounted to, which may be fixedly mounted to, the tip hinge part or to the structure of the foldable wing tip portion. The pull-back mechanism may further comprise a pull-back element, which may be in the form of a hook, mounted to, which may be fixedly mounted to, the tip latch part, to the latch link, or to the drive arm, and configured for engaging the pull-back catch to pull back the foldable wing tip portion from the folded position to the extended position when the drive arm is rotated in a reverse direction, i.e. reverse from the direction in which the drive arm rotates to move the foldable wing tip portion to the folded position.

The pull-back mechanism may be configured such that the pull-back element is engaged with the pull-back catch when the tip latch part is in the unlatched position, and the pull-back element is disengaged from the pull-back catch when the tip latch part is in the latched position. In such a way, a simple and efficient pull back mechanism is provided that can be operated also by rotation of the drive arm. The pull-back mechanism enables the actuation mechanism to bring the foldable wing tip portion back to the extended position in cases where the gravitational force is not sufficient to do so.

According to an exemplary embodiment, when the drive arm is in the first position, the drive arm and the latch link are in an over-centred state, where the rotatable joint between the drive arm and the latch link is not aligned with the drive axis and the rotatable joint between the latch link and the tip latch part, i.e. the rotatable joint between the drive arm and the latch link does not lie on a straight line connecting the drive axis and the rotatable joint between the latch link and the tip latch part, but is offset from said line to a certain extent in an inboard direction, i.e. in the direction to the fuselage. In the first position of the drive arm the drive arm and/or the latch link rests against a stop member may be fixedly mounted to the fixed wing and limiting rotation of the drive arm beyond the first position, i.e., before the first position, may be in the inboard direction. By such a configuration of the drive arm and the latch link being in an over-centred state in the first position of the drive arm and at the same time resting against the stop member, a self-locking effect for the tip latch part can be achieved, so that the tip latch part cannot rotate out of the latched position on its own, as this would merely push the drive arm or latch link further onto the stop member which thus blocks any rotation of the tip latch part out of the latched position. The only way for the tip latch part to rotate out of the latched position is being pulled by the drive arm and latch link when the drive arm rotates out of the first position towards the second position, thereby eliminating the over-centred state of the drive arm and the latch link.

According to an exemplary embodiment, the actuation mechanism comprises a locking mechanism for locking the tip latch part and the wing latch part in latching engagement with one another. The locking mechanism may be operated by rotation of the drive arm. In such a way, no separate motor is required to operate the locking mechanism. Rather, all components of the actuation mechanism can be operated by rotation of drive arm only requiring a single motor.

The locking mechanism may comprise a locking element, such as a locking cam, mounted to the fixed wing in a manner rotatable about a locking axis between a locked position and an unlocked position. The locking axis may be parallelly spaced from the drive axis. In the locked position the locking element engages the tip latch part, which may be a latch cam in the form of a corresponding surface, recess or projection of the tip latch part, and thereby inhibits the tip latch part from rotating out of the latched position. In the unlocked position the locking element is disengaged from the tip latch part and allows rotation of the tip latch part towards the unlatched position. In such a way, a simple and efficient locking mechanism for locking the tip latch part in the latched position is provided.

Furthermore, the locking element may be moved between the locked position and the unlocked position by a locking linkage that can be operated by rotation of the drive arm about the drive axis. Such a locking linkage is a simple and reliable way to operatively couple the locking element to the drive arm.

Moreover, the locking linkage may comprise a locking drive arm, a swinging link, a first locking link, and a second locking link. The locking drive arm is mounted to the fixed wing in a manner rotatable about the drive axis and rotationally fixed with the drive arm, with respect to the drive axis. The locking drive arm may extend under an angle of between 30° and 180°, for example, 100°, from the drive arm. The swinging link is mounted to the fixed wing in a manner rotatable about a swinging axis and having first and second link portions on opposite sides of the swinging axis, may be extending away from the swinging axis in opposite direction or at least partly opposite directions. The first locking link couples the first link portion of the swinging link to the locking drive arm, which may be by being rotatably mounted to the locking drive arm at a first end and rotatably mounted to the first link portion at an opposite second end of the first locking link. The second locking link couples the second link portion of the swinging link to the locking element, which may be by being rotatably mounted to the locking element at a first end and rotatably mounted to the second link portion at an opposite second end of the second locking link. In such a way, a simple and efficient locking linkage is provided.

The locking element and the tip latch part may be configured to engage in a snapping manner, when the locking element is rotated into the locked position and the tip latch part is in the latched position. This can be realized for example by the corresponding portions of the locking element and the tip latch part contacting each other and slightly deform before snapping into the locked position, e.g. caused by slightly eccentric contours of the latch cam and the locking cam. By such a snapping engagement of the locking element and the tip latch part a self-closing effect can be achieved that makes the locking process more simple and more secure.

A further aspect of the present invention relates to an actuation mechanism for the wing according to any of the afore-described embodiments. The features and effects described above in connection with the wing apply vis-à-vis to the actuation mechanism. In particular, the actuation mechanism comprises a drive arm configured for being mounted to the fixed wing in a manner rotatably driven about a drive axis. The drive arm is configured to effect movement of the foldable wing tip portion between the extended position and the folded position upon rotation of the drive arm about the drive axis. The drive arm is configured such that in the extended position of the foldable wing tip portion upon rotation of the drive arm the drive arm contacts the catch element and upon further rotation pushes the foldable wing tip portion towards the folded position.

Yet a further aspect of the present invention relates to an aircraft comprising a wing according to any of the embodiment described above or to an actuation mechanism according to any of the embodiment described above. The features and effects described above in connection with the wing and the actuation mechanism apply vis-à-vis to the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

FIGS. 2-10 show an exemplary aircraft 1 according to an exemplary embodiment of the present invention. The aircraft 1 comprises a foldable wing 3 including a fixed wing 5 mounted to a fuselage 7, and a foldable wing tip portion 9 movably mounted to the fixed wing 5.

Figure 1:
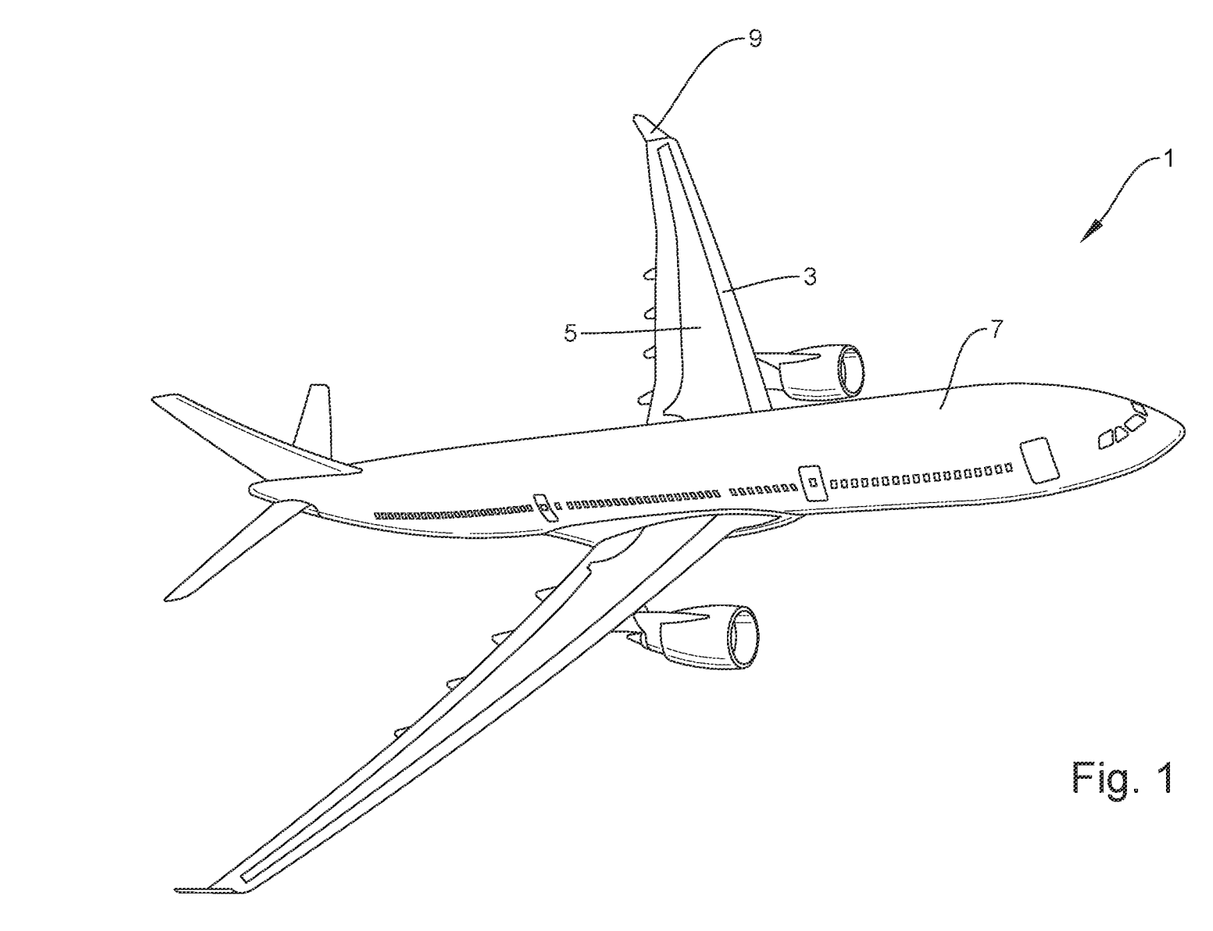
FIG. 1 is a perspective view of an aircraft according to an exemplary embodiment of the invention.
Figure 2:
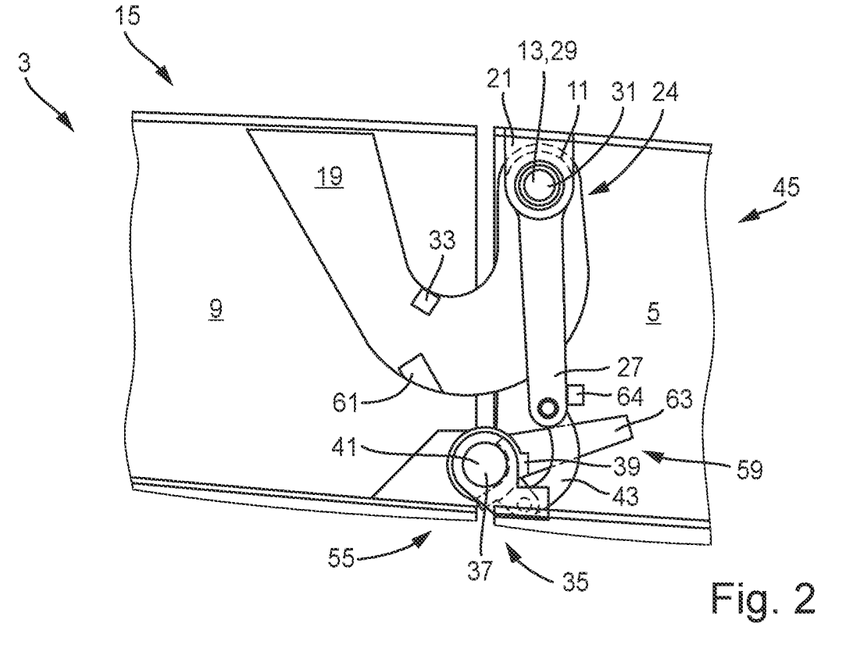
FIGS. 2-6 are detailed side views of a wing according to an exemplary embodiment of the invention, with a view on the actuation mechanism at different stages of actuation.
Figure 3:
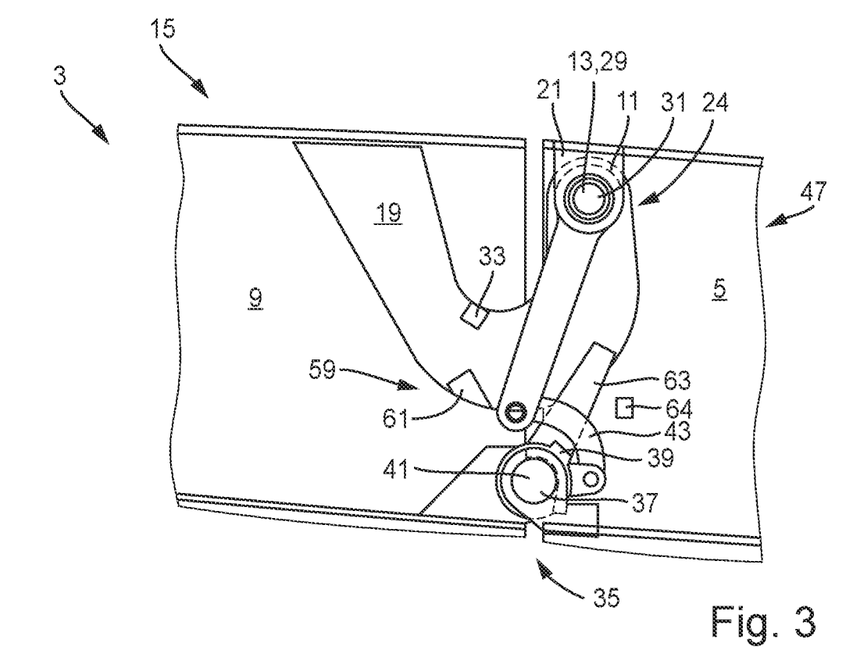
Figure 4:
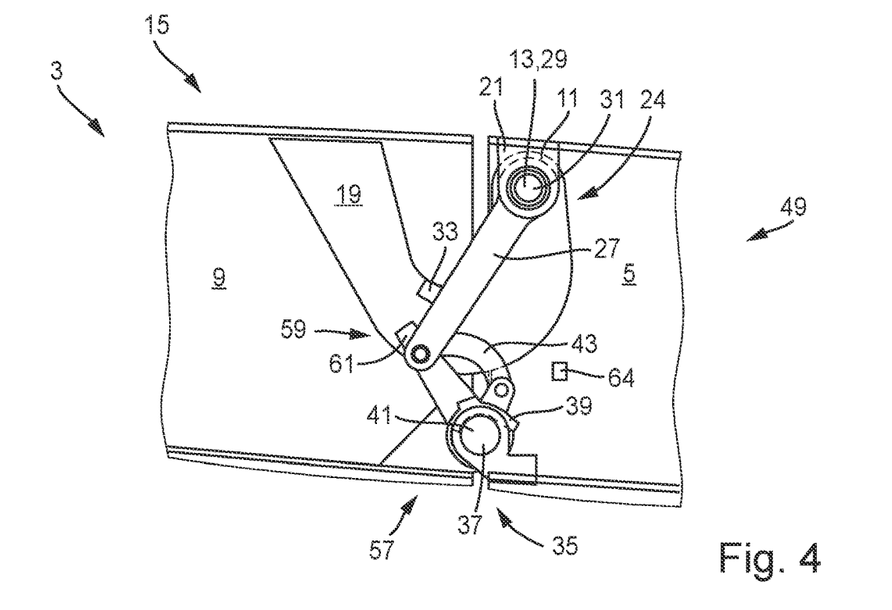
Figure 5:
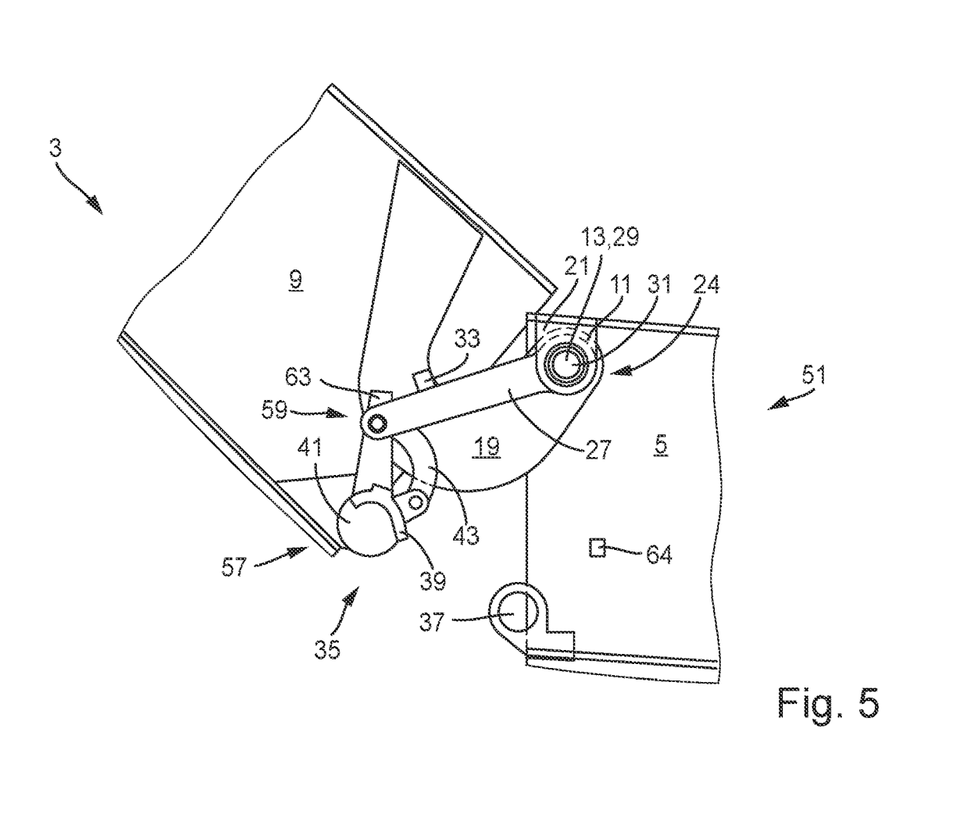
Figure 6:
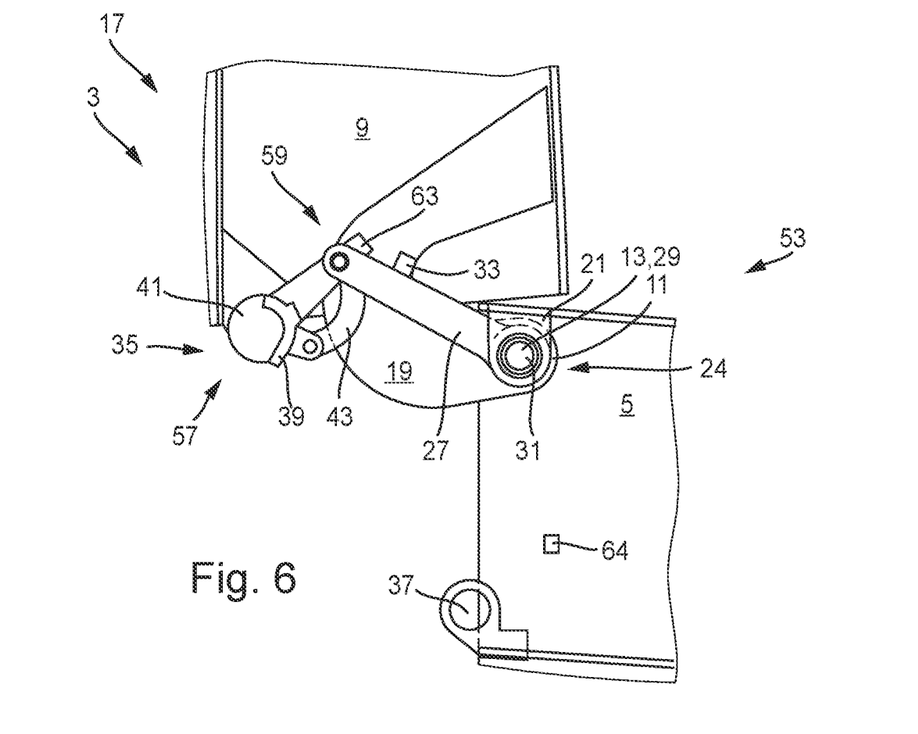
Figure 7:
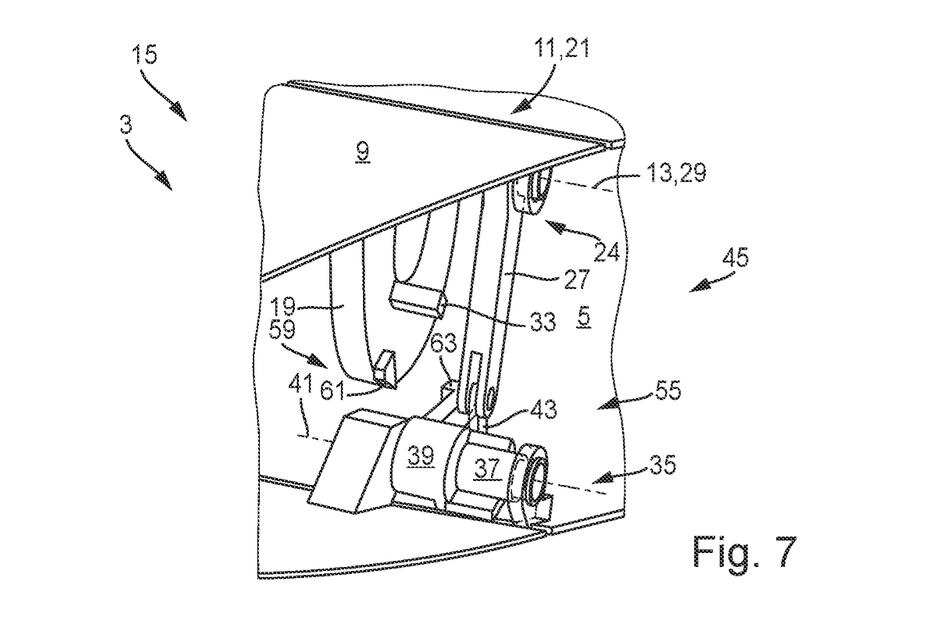
FIGS. 7-9 are detailed perspective views of the wing shown in FIGS. 2-6, with a view on the actuation mechanism at different stages of actuation.
Figure 8:
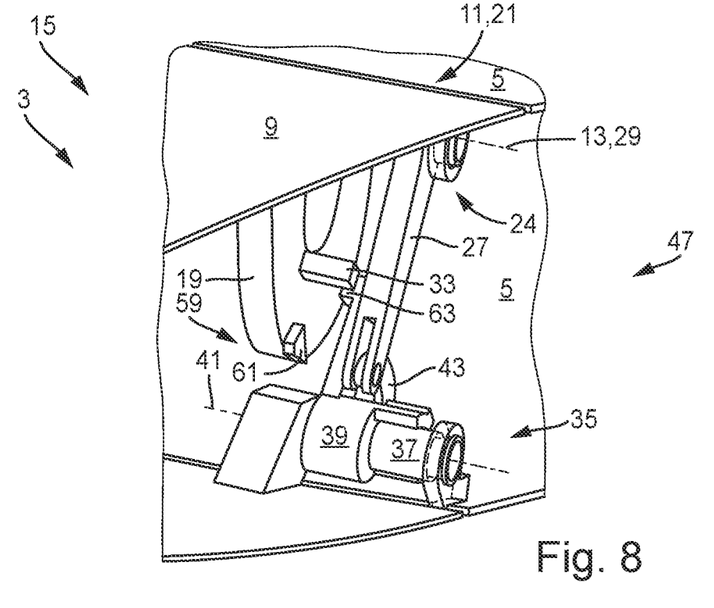
Figure 9:
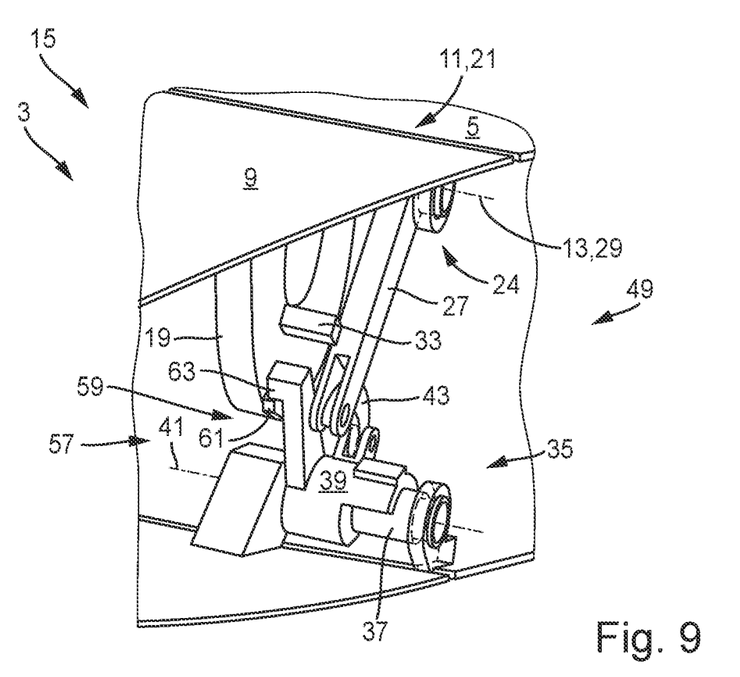
Figure 10:
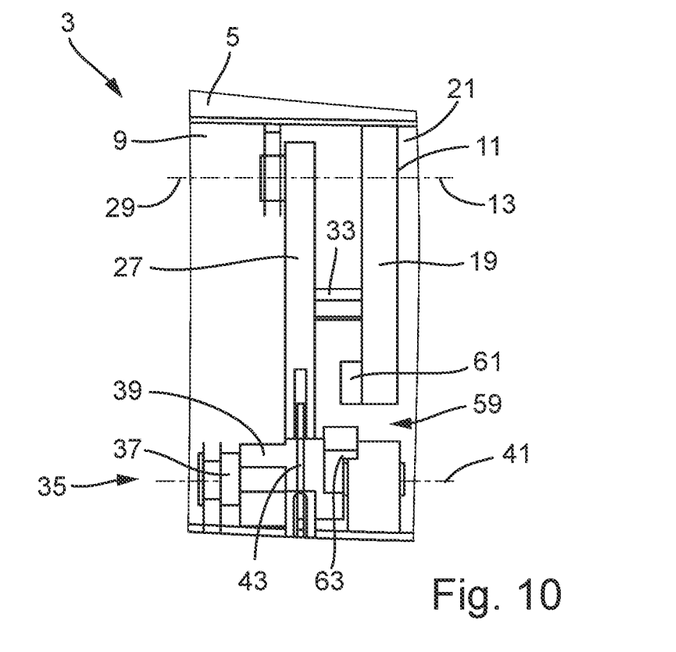
FIG. 10 is a front view of the actuation mechanism of the wing shown in FIGS. 2-6.
Figure 11:
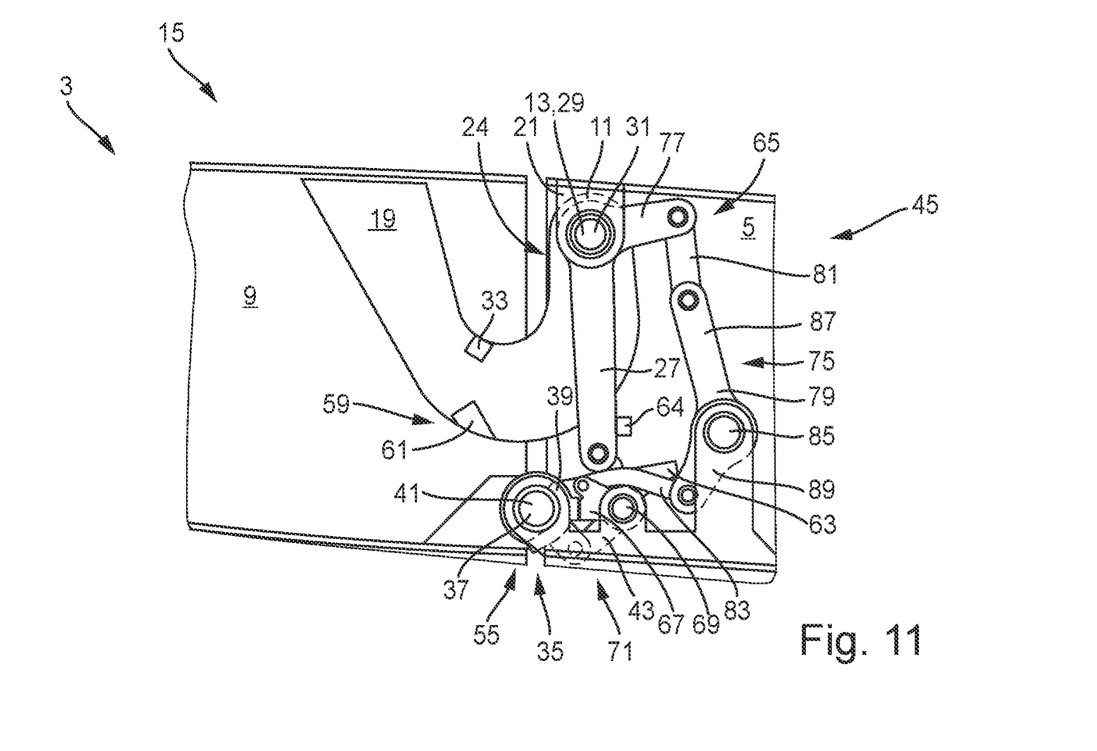
FIGS. 11-17 are detailed side views of a wing according to a second embodiment of the invention, with a view on the actuation mechanism at different stages of actuation.
Figure 12:
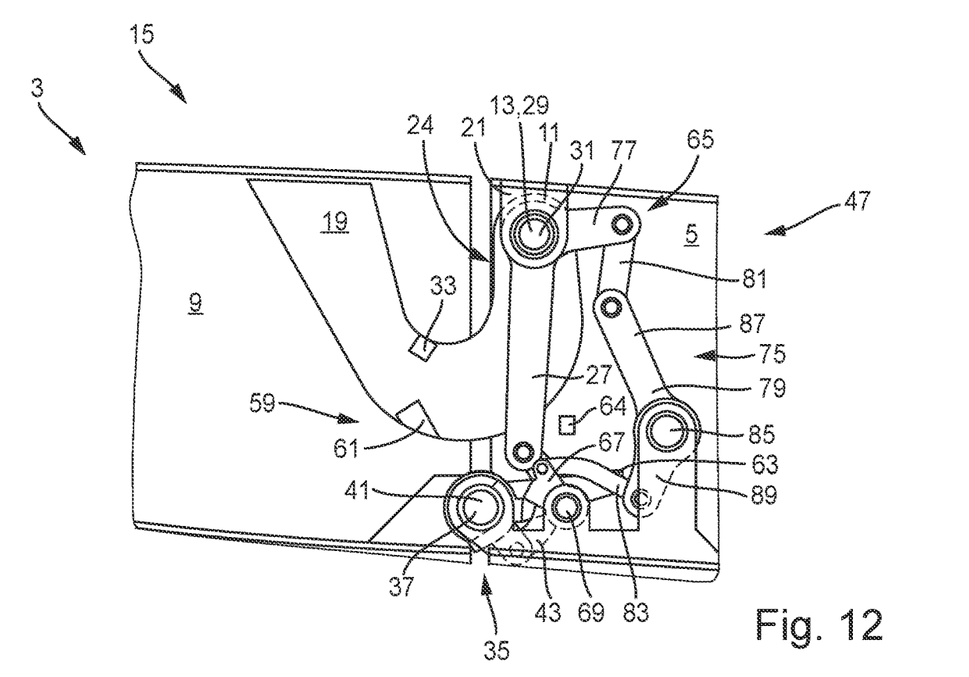
Figure 13:
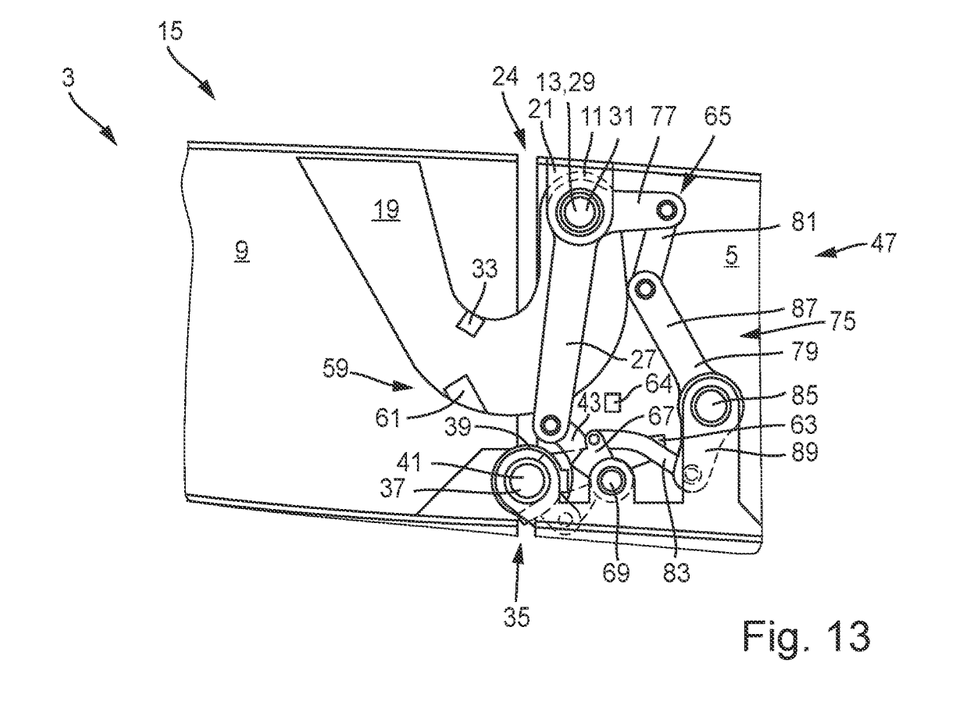
Figure 14:
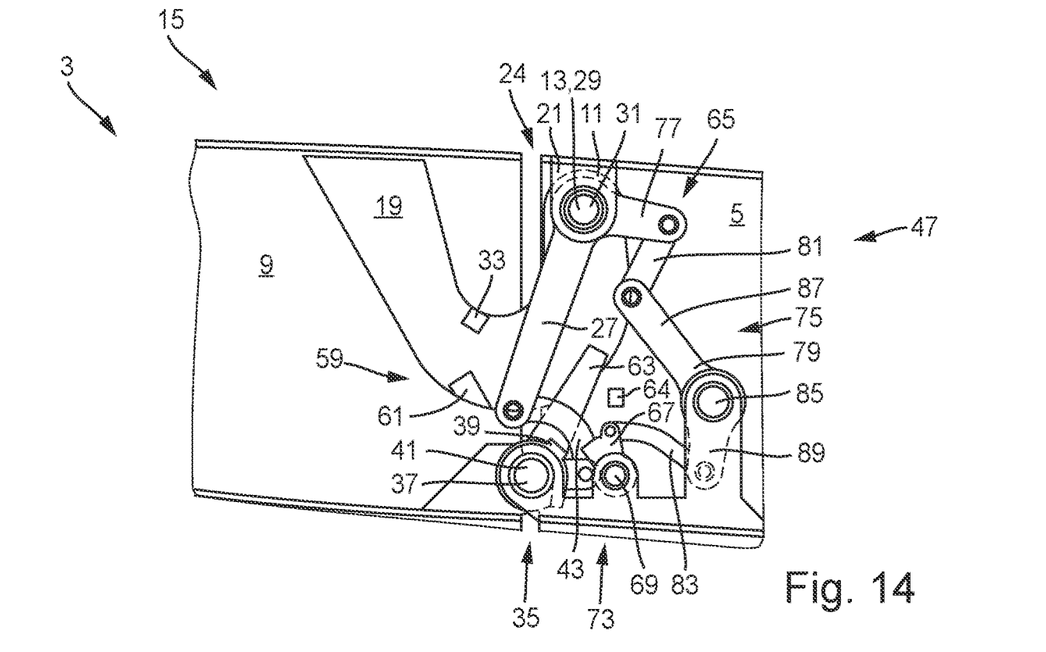
Figure 15:
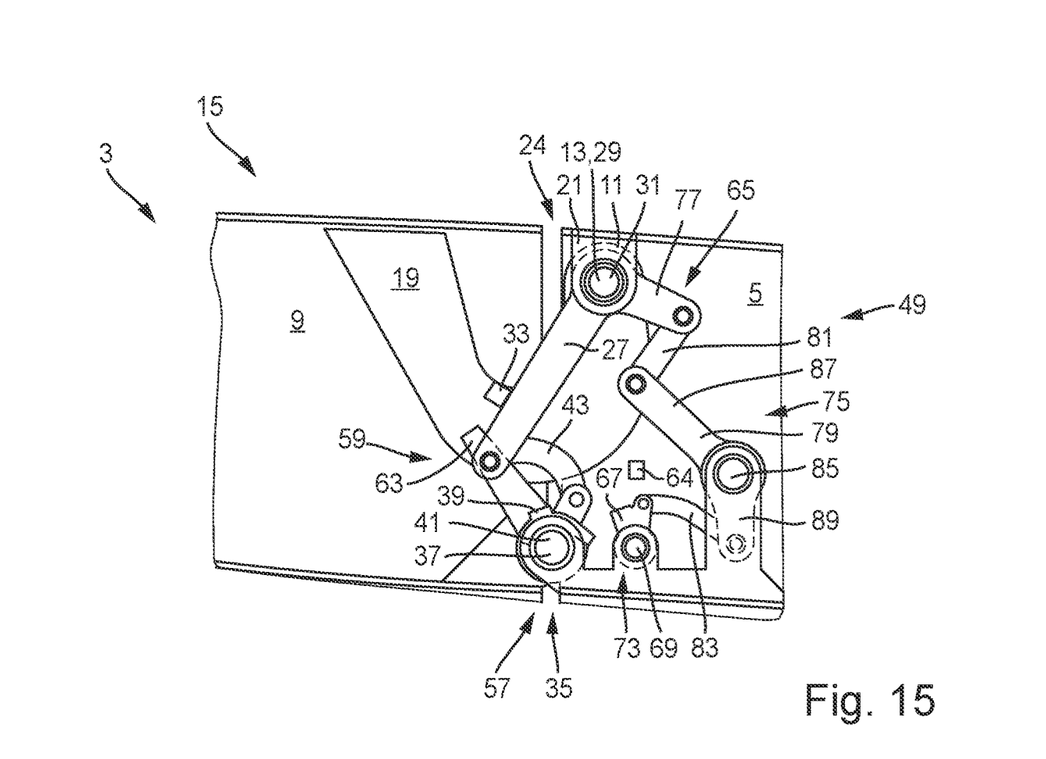
Figure 16:
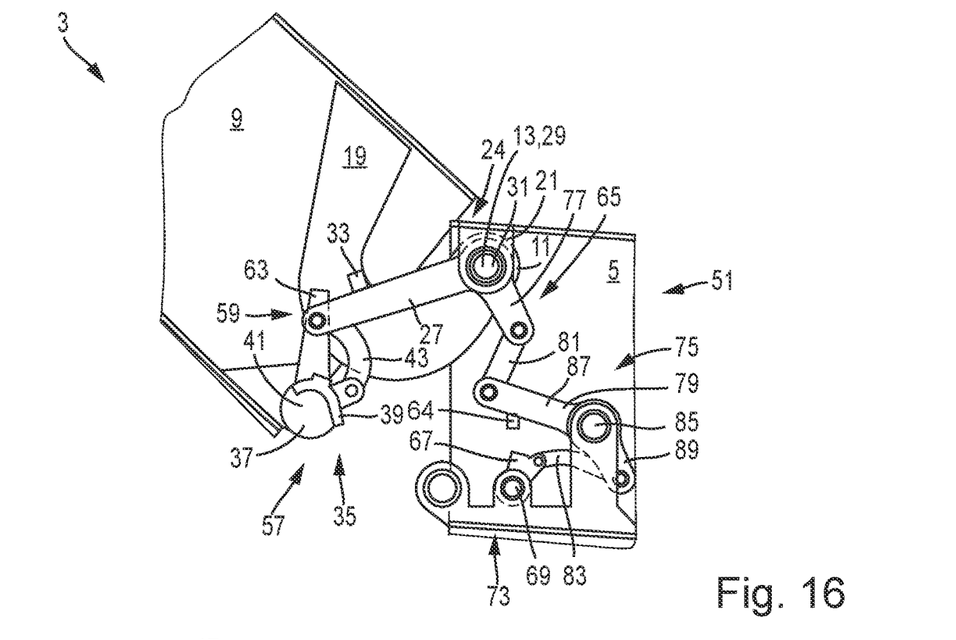
Figure 17:
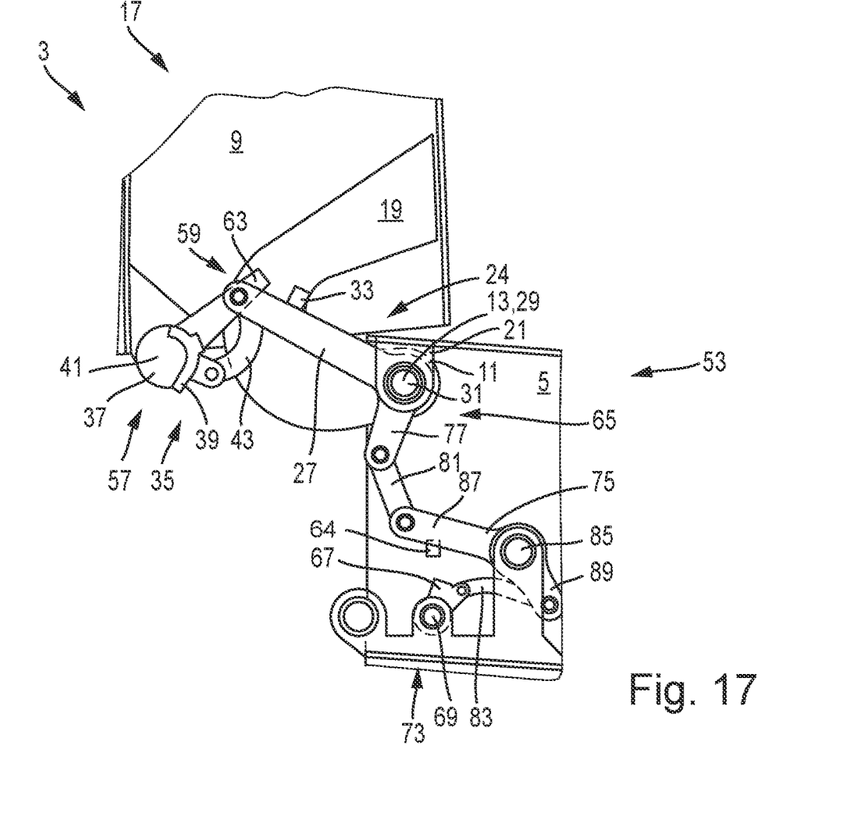
Figures 18, 19:
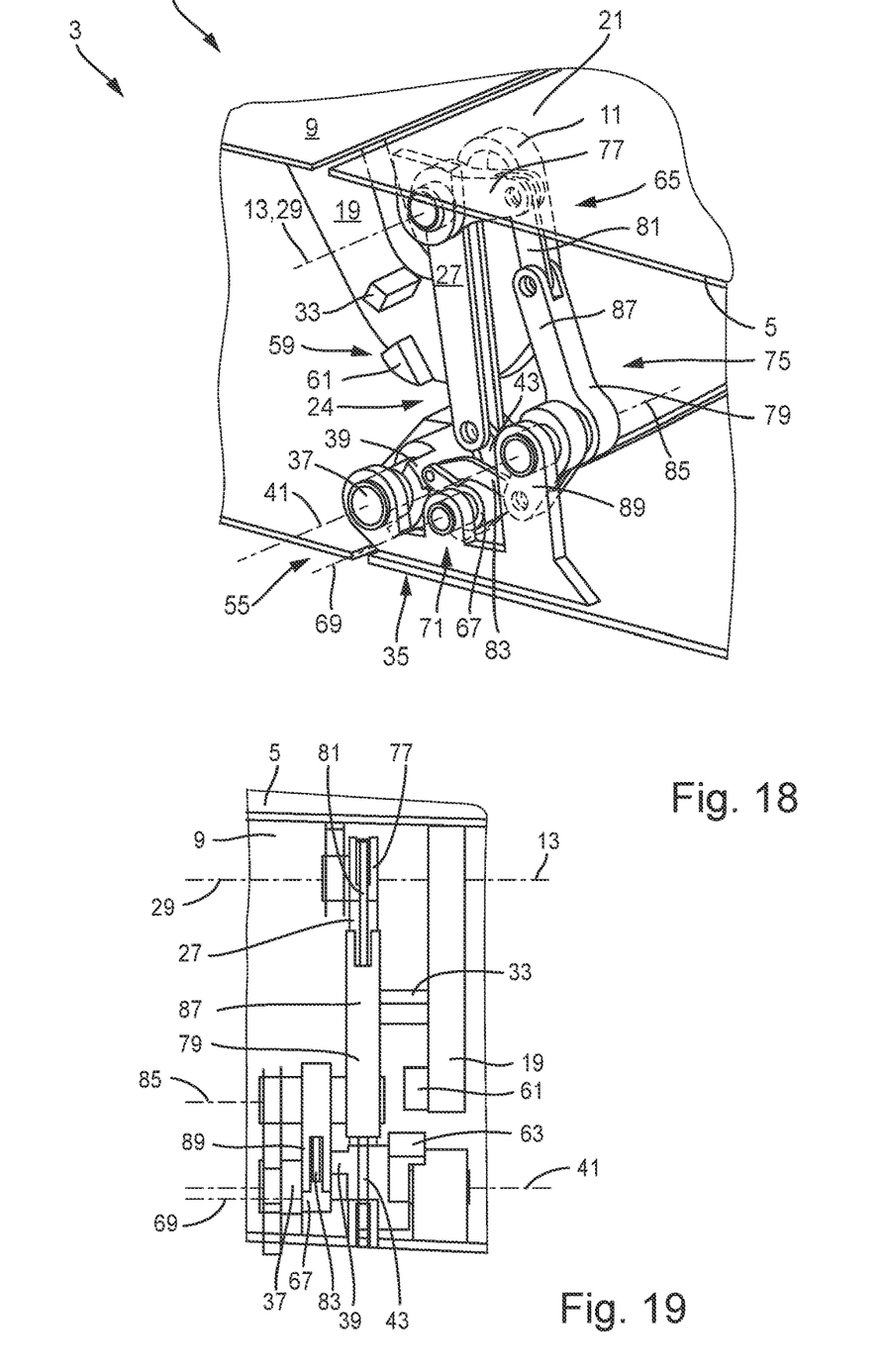
FIG. 18 is a detailed perspective view of the wing shown in FIGS. 11-17, with a view on the actuation mechanism.
FIG. 19 is a front view of the actuation mechanism of the wing shown in FIGS. 11-17.

FIGS. 2 to 1o illustrate a first embodiment of the wing 3 of the aircraft 1 shown in FIG. 1 in further detail. The foldable wing tip portion 9 is mounted to the fixed wing 5 via a hinge 11 rotatable about a hinge axis 13 between an extended position 15 and a folded position 17. In the extended position 15 the foldable wing tip portion 9 extends as a continuous extension of the fixed wing 5 in a common plane with the fixed wing 5, wherein in the folded position 17 the foldable wing tip portion 9 extends upwards in order to reduce the overall span of the aircraft 1. The hinge axis 13 extends in parallel to a chord line and in a flight direction of the aircraft 1. The hinge 11 comprises a tip hinge part 19 mounted to the foldable wing tip portion 9 and a wing hinge part 21 mounted to the fixed wing 5 and engaging the tip hinge part 19 in a manner rotatable about the hinge axis 13. The hinge axis 13 is located at the upper leading edge side of the fixed wing 5 and the tip hinge part 19 is in the form of a goose neck, so that the foldable wing tip portion 9 in the folded position 17 can be pivoted to a far inboard position above the upper surface of the fixed wing 5.

The wing 3 further comprises an actuation mechanism 24 for actuating the foldable wing tip portion 9 for movement between the extended position 15 and the folded position 17. The actuation mechanism 24 comprises a drive arm 27 mounted to the fixed wing 5 in a manner rotatably driven about a drive axis 29 by a motor (not shown). Specifically, the drive arm 27 is mounted to a rotating drive shaft 31 driven by the motor. The drive arm 27 is configured to effect movement of the foldable wing tip portion 9 between the extended position 15 and the folded position 17 upon rotation of the drive arm 27 about the drive axis 29.

The actuation mechanism 24 comprises a catch element 33 in the form of a pin or projection mounted to the tip hinge part 19. The drive arm 27 and the catch element 33 are configured such that in the extended position 15 of the foldable wing tip portion 9 upon rotation of the drive arm 27 the drive arm 27 contacts the catch element 33 and upon further rotation pushes the foldable wing tip portion 9 towards the folded position 17. In the first embodiment shown in FIGS. 2 to 1o, the drive axis 29 is coaxial with the hinge axis 13.

As also shown in FIGS. 2 to 1o, the actuation mechanism 24 comprises a latch mechanism 35 for latching the foldable wing tip portion 9 against the fixed wing 5 in the extended position 15. The latch mechanism 35 can be operated by rotation of the drive arm 27. In such a way, movement of the foldable wing tip portion 9 between the extended position 15 and the folded position 17 as well as latching of the foldable wing tip portion 9 in the extended position 15 can be actuated only by movement of the drive arm 27, and thus only by a single motor.

The latch mechanism 35 comprises a wing latch part 37 mounted to the fixed wing 5, and a tip latch part 39 mounted to the foldable wing tip portion 9 in a manner rotatable about a latch axis 41. The latch axis 41 is parallelly spaced from the drive axis 29. The tip latch part 39 can be brought into latching engagement with the wing latch part 37 by rotating the tip latch part 39 about the latch axis 41 when the foldable wing tip portion 9 is in the extended position 15. The drive arm 27 is coupled to the tip latch part 39 via a latch link 43, such that the drive arm 27, when rotating about the drive axis 29, causes the tip latch part 39, through the latch link 43, to rotate about the latch axis 41. The latch link 43 is rotatably mounted to the drive arm 27 by a rotatable joint at its one end and is rotatably mounted to the tip latch part 39 by a rotatable joint at its opposite end. The wing latch part 37 is formed as a bolt and the tip latch part 39 is formed as a semi-circular sleeve engaging the bolt.

The actuation mechanism 24 is configured such that the drive arm 27 rotates about the drive axis 29 from a first position 45 along a first angular range 47 to a second position 49 and subsequently from the second position 49 along a second angular range 51 to a third position 53, in the present embodiment by continuous rotation. In the first position 45 of the drive arm 27 the tip latch part 39 is in a latched position 55 relative to the wing latch part 37. In the second position 49 of the drive arm 27 the tip latch part 39 is in an unlatched position 57 relative to the wing latch part 37. When the drive arm 27 is rotated along the first angular range 47 from the first position 45 to the second position 49, the tip latch part 39 is rotated about the latch axis 41 from the latched position 55 to the unlatched position 57. Further, in the first position 45 and along the first angular range 47 the drive arm 27 is out of contact with the catch element 33. In the second position 49 the drive arm 27 contacts the catch element 33. When the drive arm 27 is rotated along the second angular range 51 from the second position 49 to the third position 53, the drive arm 27 is in continuous contact with the catch element 33, while the foldable wing tip portion 9 is moved from the extended position 15 to the folded position 17.

As also shown in FIGS. 2 to 10, the actuation mechanism 24 comprises a pull-back mechanism 59 for pulling the foldable wing tip portion 9 from the folded position 17 back to the extended position 15. The pull-back mechanism 59 comprises a pull-back catch 61 in the form of a pin or a projection mounted to the tip hinge part 19. The pull-back mechanism 59 further comprises a pull-back element 63 in the form of a hook mounted to the tip latch part 39 and configured for engaging the pull-back catch 61 to pull back the foldable wing tip portion 9 from the folded position 17 to the extended position 15 when the drive arm 27 is rotated in a reverse direction, i.e. reverse from the direction in which the drive arm 27 rotates to move the foldable wing tip portion 9 to the folded position 17. The pull-back mechanism 59 is configured such that the pull-back element 63 is engaged with the pull-back catch 61 when the tip latch part 39 is in the unlatched position 57, and the pull-back element 63 is disengaged from the pull-back catch 61 when the tip latch part 39 is in the latched position 55. The pull-back mechanism 59 enables the actuation mechanism 24 to bring the foldable wing tip portion 9 back to the extended position 15 in cases where the gravitational force is not sufficient to do so.

As visible in FIGS. 2 to 6, when the drive arm 27 is in the first position 45, the drive arm 27 and the latch link 43 are in an over-centred state, where the rotatable joint between the drive arm 27 and the latch link 43 is not aligned with the drive axis 29 and the rotatable joint between the latch link 43 and the tip latch part 39, i.e. the rotatable joint between the drive arm 27 and the latch link 43 does not lie on a straight line connecting the drive axis 29 and the rotatable joint between the latch link 43 and the tip latch part 39, but is offset from said line to a certain extent in an inboard direction, i.e. in the direction to the fuselage 7. In the first position 45 of the drive arm 27 the drive arm 27 rests against a stop member 64 mounted to the fixed wing 5 and limiting rotation of the drive arm 27 beyond the first position 45, i.e. before the first position 45, in the inboard direction. By such a configuration of the drive arm 27 and the latch link 43 being in an over-centred state in the first position 45 of the drive arm 27 and at the same time resting against the stop member 64, a self-locking effect for the tip latch part 39 can be achieved, so that the tip latch part 39 cannot rotate out of the latched position 55 on its own, as this would merely push the drive arm 27 further onto the stop member 64 which thus blocks any rotation of the tip latch part 39 out of the latched position 55. The only way for the tip latch part 39 to rotate out of the latched position 55 is being pulled by the drive arm 27 and latch link 43 when the drive arm 27 rotates out of the first position 45 towards the second position 49, thereby eliminating the over-centred state of the drive arm 27 and the latch link 43.

In FIGS. 11 to 19 a second embodiment of the invention is shown that differs from the first embodiment shown in FIGS. 2 to 10 in that the actuation mechanism 24 further comprises a locking mechanism 65 for locking the tip latch part 39 and the wing latch part 37 in latching engagement with one another. The locking mechanism 65 can be operated by rotation of the drive arm 27. The locking mechanism 65 comprises a locking element 67 in the form of a locking cam mounted to the fixed wing 5 in a manner rotatable about a locking axis 69 between a locked position 71 and an unlocked position 73. The locking axis 69 is parallelly spaced from the drive axis 29. In the locked position 71 the locking element 67 engages the tip latch part 39, specifically a latch cam of the tip latch part 39, and thereby inhibits the tip latch part 39 from rotating out of the latched position 55. In the unlocked position 73 the locking element 67 is disengaged from the tip latch part 39 and allows rotation of the tip latch part 39 towards the unlatched position 57.

As shown in FIGS. 11 to 19, the locking element 67 is moved between the locked position 71 and the unlocked position 73 by a locking linkage 75 that can be operated by rotation of the drive arm 27 about the drive axis 29. The locking linkage 75 comprises a locking drive arm 77, a swinging link 79, a first locking link 81, and a second locking link 83. The locking drive arm 77 is mounted to the fixed wing 5 in a manner rotatable about the drive axis 29 and rotationally fixed with the drive arm 27, with respect to the drive axis 29. In the present embodiment, the locking drive arm 77 extends under an angle of about 100° from the drive arm 27. The swinging link 79 is mounted to the fixed wing 5 in a manner rotatable about a swinging axis 85 and having first and second link portions 87, 89 on opposite sides of the swinging axis 85 and extending away from the swinging axis 85 in opposite directions or at least partly opposite directions. The first locking link 81 couples the first link portion 87 of the swinging link 79 to the locking drive arm 77 by being rotatably mounted to the locking drive arm 77 at a first end and rotatably mounted to the first link portion 87 at an opposite second end of the first locking link 81. The second locking link 83 couples the second link portion 89 of the swinging link 79 to the locking element 67 by being rotatably mounted to the locking element 67 at a first end and rotatably mounted to the second link portion 89 at an opposite second end of the second locking link 83.

The locking element 67 and the tip latch part 39 are configured to engage in a snapping manner, when the locking element 67 is rotated into the locked position 71 and the tip latch part 39 is in the latched position 55 or rotated to the latched position 55. In the present embodiment, this is realized by the corresponding portions of the locking element 67 and the tip latch part 39, i.e. the locking cam and the latch cam, contacting each other and slightly deform before snapping into the locked position 71. This is caused by slightly eccentric contours of the latch cam and the locking cam. By such a snapping engagement of the locking element 67 and the tip latch part 39 a self-closing effect of the locking mechanism 65 is achieved.

Figure 20:
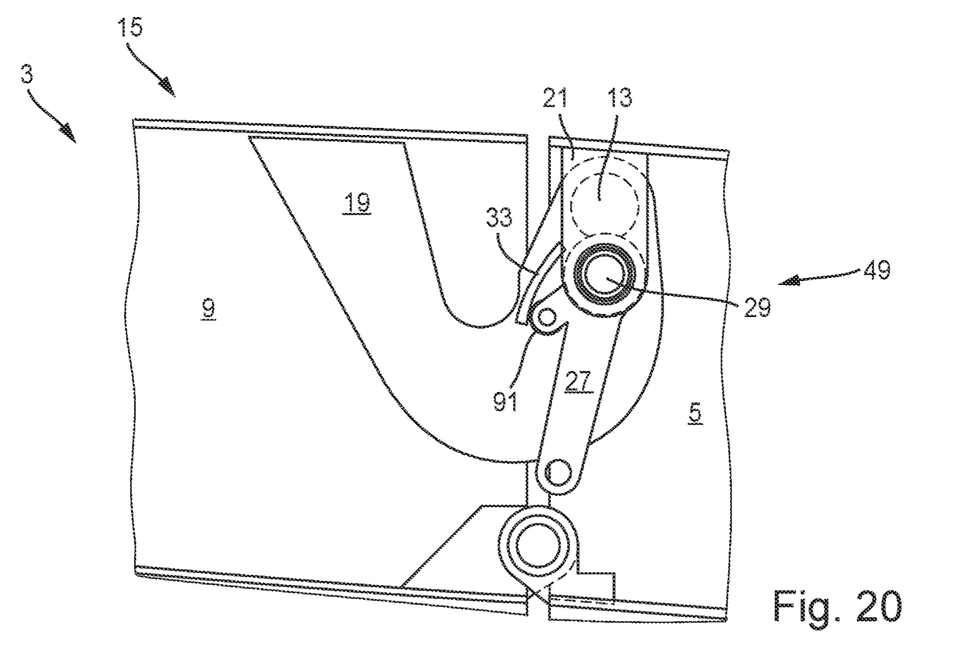
FIGS. 20-21 are detailed side views of a wing according to an exemplary embodiment of the invention, with a view on the actuation mechanism at different stages of actuation.
Figure 21:
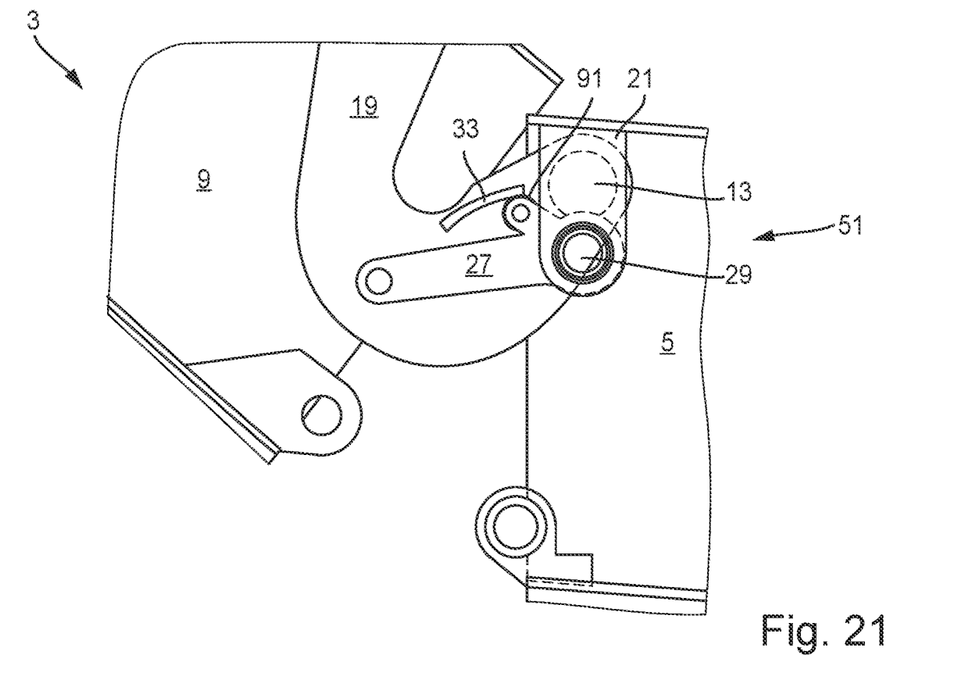

In FIGS. 20 to 21 a third embodiment of the invention is shown that differs from the first embodiment shown in FIGS. 2 to 10 in that the drive axis 29 is parallelly spaced from the hinge axis 13, instead of being coaxial with the hinge axis 13. Further, the catch element 33 is formed as an elongate guide surface along which the drive arm 27 rolls by a roller 91 mounted to a projecting part of the drive arm 27, while the drive arm 27 pushes the foldable wing tip portion 9 towards the folded position 17. By such an arrangement, the torque applied to the foldable wing tip portion 9 and its rotational speed during rotation from the extended position 15 to the folded position 17 can be tailored as required.

By the invention as described above, a wing 3 with a very simple, compact and reliable actuation mechanism 24 is provided that allows easy assembly and maintenance.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a fixed wing,
a foldable wing tip portion mounted to the fixed wing via a hinge rotatable about a hinge axis between an extended position and a folded position, and
an actuation mechanism for actuating the foldable wing tip portion for movement between the extended position and the folded position,
wherein the hinge comprises a tip hinge part mounted to the foldable wing tip portion and a wing hinge part mounted to the fixed wing and engaging the tip hinge part in a manner rotatable about the hinge axis,
wherein the actuation mechanism comprises a drive arm mounted to the fixed wing in a manner rotatably driven about a drive axis, and
wherein the drive arm is configured to effect movement of the foldable wing tip portion between the extended position and the folded position upon rotation of the drive arm about the drive axis,
wherein the actuation mechanism comprises a catch element mounted to the tip hinge part or to a structure of the foldable wing tip portion, and
the drive arm and the catch element are configured such that in the extended position of the foldable wing tip portion upon rotation of the drive arm, the drive arm contacts the catch element and upon further rotation pushes the foldable wing tip portion towards the folded position.

2. The wing according to claim 1, wherein the drive axis is coaxial with the hinge axis.

3. The wing according to claim 1, wherein the drive axis is parallelly spaced from the hinge axis.

4. The wing according to claim 1, wherein the actuation mechanism further comprises a latch mechanism for latching the foldable wing tip portion in the extended position, and
wherein the latch mechanism can be operated by rotation of the drive arm.

5. The wing according to claim 4, wherein the latch mechanism comprises a wing latch part mounted to the fixed wing, and a tip latch part mounted to the foldable wing tip portion in a manner rotatable about a latch axis,
wherein the tip latch part can be brought into latching engagement with the wing latch part by rotating the tip latch part about the latch axis when the foldable wing tip portion is in the extended position,
wherein the drive arm is coupled to the tip latch part via a latch link, such that the drive arm when rotating about the drive axis causes the tip latch part, through the latch link, to rotate about the latch axis.

6. The wing according to claim 5, wherein the wing latch part is formed as a bolt and the tip latch part is formed as a semi-circular sleeve engaging the bolt.

7. The wing according to claim 5, wherein the actuation mechanism is configured such that the drive arm rotates about the drive axis from a first position along a first angular range to a second position and subsequently from the second position along a second angular range to a third position,
wherein in the first position of the drive arm the tip latch part is in a latched position relative to the wing latch part,
wherein in the second position of the drive arm the tip latch part is in an unlatched position relative to the wing latch part,
wherein, when the drive arm is rotated along the first angular range from the first position to the second position, the tip latch part is rotated about the latch axis from the latched position to the unlatched position,
wherein in the first position and along the first angular range the drive arm is out of contact with the catch element,
wherein in or near the second position the drive arm contacts the catch element, and
wherein, when the drive arm is rotated along the second angular range from the second position to the third position, the drive arm is in contact with the catch element, while the foldable wing tip portion is moved from the extended position to the folded position.

8. The wing according to claim 5, wherein the actuation mechanism further comprises a pull-back mechanism for pulling the foldable wing tip portion from the folded position back to the extended position,
wherein the pull-back mechanism comprises a pull-back catch mounted to the tip hinge part or to the structure of the foldable wing tip portion, and
wherein the pull-back mechanism comprises a pull-back element mounted to the tip latch part, to the latch link, or to the drive arm and configured for engaging the pull-back catch to pull back the foldable wing tip portion from the folded position to the extended position when the drive arm is rotated in a reverse direction, and
wherein the pull-back mechanism is configured such that the pull-back element is engaged with the pull-back catch when the tip latch part is in an unlatched position, and the pull-back element is disengaged with the pull-back catch when the tip latch part is in a latched position.

9. The wing according to claim 5, wherein the actuation mechanism further comprises a locking mechanism for locking the tip latch part and the wing latch part in the latching engagement with one another, and wherein the locking mechanism is configured to be operated by rotation of the drive arm.

10. The wing according to claim 9, wherein the locking mechanism further comprises a locking element mounted to the fixed wing in a manner rotatable about a locking axis between a locked position and an unlocked position, wherein in the locked position the locking element engages the tip latch part and thereby inhibits the tip latch part from rotating out of a latched position, and wherein in the unlocked position the locking element is disengaged from the tip latch part and allows rotation of the tip latch part towards an unlatched position.

11. The wing according to claim 10, wherein the locking element is moved between the locked position and the unlocked position by a locking linkage that can be operated by rotation of the drive arm about the drive axis.

12. The wing according to claim 11, wherein the locking linkage comprises:

a locking drive arm mounted to the fixed wing in a manner rotatable about the drive axis and rotationally fixed with the drive arm, a swinging link mounted to the fixed wing in a manner rotatable about a swinging axis and having first and second link portions on opposite sides of the swinging axis, a first locking link coupling the first link portion of the swinging link to the locking drive arm, and a second locking link coupling the second link portion of the swinging link to the locking element.

13. The wing according to claim 10, wherein the locking element and the tip latch part are configured to engage in a snapping manner, when the locking element is rotated into the locked position.

14. An aircraft comprising the wing according to claim 1.

* * * * *